United States Patent
Morisaki et al.

(10) Patent No.: US 8,855,608 B2
(45) Date of Patent: Oct. 7, 2014

(54) INFORMATION PROCESSING SYSTEM, MOBILE TERMINAL, LINKAGE SERVER, AND INFORMATION PROCESSING METHOD

(75) Inventors: Mitsunori Morisaki, Tokyo (JP); Masahiro Takei, Tokyo (JP); Yohei Hirokawa, Tokyo (JP); Kazuhiro Okanoue, Tokyo (JP)

(73) Assignee: NEC Corporation, Tokyo (JP)

( * ) Notice: Subject to any disclaimer, the term of this patent is extended or adjusted under 35 U.S.C. 154(b) by 0 days.

(21) Appl. No.: 13/703,605

(22) PCT Filed: May 24, 2011

(86) PCT No.: PCT/JP2011/002879
§ 371 (c)(1),
(2), (4) Date: Dec. 11, 2012

(87) PCT Pub. No.: WO2011/158439
PCT Pub. Date: Dec. 22, 2011

(65) Prior Publication Data
US 2013/0090140 A1    Apr. 11, 2013

(30) Foreign Application Priority Data

Jun. 14, 2010   (JP) .............................. 2010-135517

(51) Int. Cl.
| H04M 1/725 | (2006.01) |
| G06Q 10/06 | (2012.01) |
| H04W 4/12 | (2009.01) |
| H04W 4/00 | (2009.01) |

(52) U.S. Cl.
CPC ............... *H04W 4/12* (2013.01); *G06Q 10/06* (2013.01); *H04W 4/008* (2013.01)

USPC ............. 455/412.1; 455/426.1; 455/550.1

(58) Field of Classification Search
CPC ..... H04W 48/18; H04W 88/02; H04W 88/04; H04W 88/06
USPC ............. 455/412.1, 403, 550.1, 426.1, 426.2
See application file for complete search history.

(56) References Cited

U.S. PATENT DOCUMENTS

| 2001/0000505 A1* | 4/2001 | Segal et al. ............. 455/405 |
| 2005/0178830 A1* | 8/2005 | Rosenberg ............. 235/380 |

FOREIGN PATENT DOCUMENTS

| JP | 2002-222306 A | 8/2002 |
| JP | 2003-058757 A | 2/2003 |
| JP | 2003-162664 A | 6/2003 |
| JP | 2004-064493 A | 2/2004 |
| JP | 2008-153897 A | 7/2008 |

OTHER PUBLICATIONS

International Search Report in PCT/JP2011/002879 dated Aug. 2, 2011(English Translation Thereof).
Japanese Office dated Jan. 23, 2013, with partial English translation.

* cited by examiner

*Primary Examiner* — Jean Gelin
(74) *Attorney, Agent, or Firm* — McGinn IP Law Group, PLLC

(57) ABSTRACT

An information processing system 1 includes an information collection unit 11 that collects information from an outside, a first communication unit 12 that performs a business-operation data communication to perform a business operation using the collected information, a second communication unit 13 that performs a non-preset communication through voice or text message; and a linkage unit 20 that links the first communication unit 12 and the second communication unit 13.

16 Claims, 14 Drawing Sheets

FIG. 6

| USER ID FOR BUSINESS-OPERATION SERVER | USER ID FOR TEXT MESSAGE SERVER | USER ID FOR VOICE SERVER | MOBILE TERMINAL INFORMATION | LOG IN |
|---|---|---|---|---|
| 1000 | user1000 | 1000@aaa.bbb.ccc |  | ○ |
| 1020 | user-A | 2000@aaa.bbb.ccc | 192.168.0.105 | ○ |
| 1050 | user-test | 3000@aaa.bbb.ccc |  | × |
| 1100 | user_DD | 5000@aaa.bbb.ccc | 192.168.0.100 | ○ |

600

1401

| MESSAGE ID | TEXT MESSAGE INFORMATION | STATUS FLAG |
|---|---|---|
| REF-0001 | IS THERE ANY STOCK? | 1 |
| REF-0002 | PLEASE SEND IT. | 2 |
| REF-0003 | PLEASE ARRANGE DISTRIBUTION. | 1 |
| REF-0004 | PLEASE DELIVER IT. | 0 |

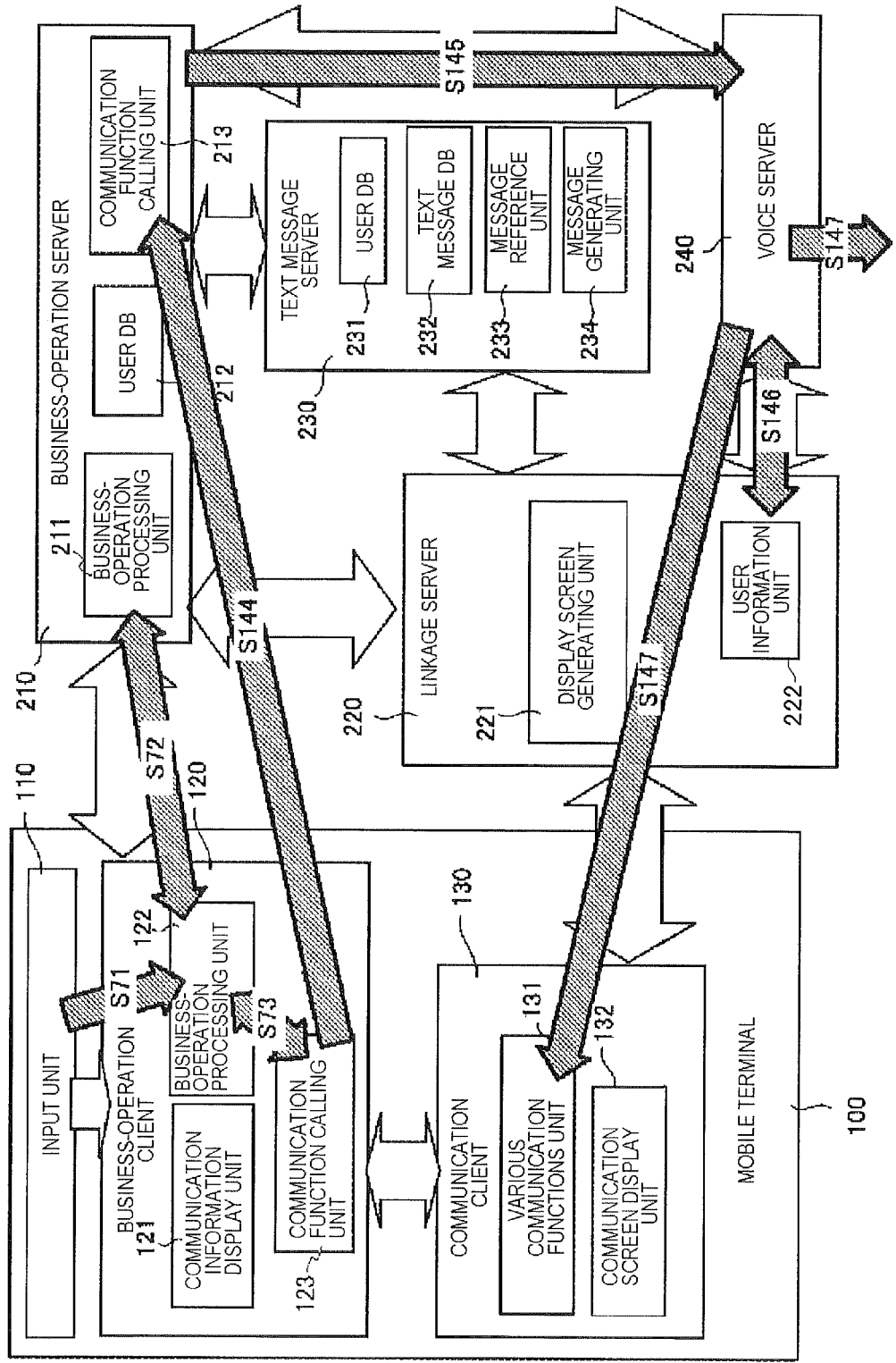

US 8,855,608 B2

INFORMATION PROCESSING SYSTEM, MOBILE TERMINAL, LINKAGE SERVER, AND INFORMATION PROCESSING METHOD

TECHNICAL FIELD

The present invention relates to information processing technique for collecting information to perform business operations.

BACKGROUND ART

Patent Document 1 discloses a technique of collecting information using a mobile terminal to carry out business operations while communicating with servers. In particular, Patent Document 1 discloses a technique in which sales clerks operate operation terminals in a train, and access a server through a wireless LAN repeater to communicate information related to products.

RELATED DOCUMENT

Patent Document

Patent Document 1: Japanese Patent Application Laid-open No. 2004-64493

SUMMARY OF THE INVENTION

However, with the technique described in Patent Document 1 above, communication such as telephone communication and message transmission cannot be performed using operation terminals for performing business operations. Thus, when wishing to consult a person in charge to solve a problem occurring during business operations, the sales clerk needs to narrow down a possible cause of the problem, find a contact destination, use and operate a fixed phone or mobile phone, and finally be able to get into contact with the target person, which require lots of efforts.

An object of the present invention is to solve the problem of the conventional technique described above.

In each aspect of the present invention, the following configurations are employed to solve the problems described above.

A system according to a first aspect of the present invention includes an information collection unit that collects information from an outside; a first communication unit that performs a business-operation data communication to perform a business operation using the collected information; a second communication unit that performs a non-preset communication through voice or text message; and a linkage unit that links the first communication unit and the second communication unit.

A mobile terminal according to a second aspect of the present invention includes an information collection unit that collects information from an outside; a first communication unit that performs a business-operation data communication to perform a business operation using the collected information; a second communication unit that performs a non-preset communication through voice or text message; and a linkage unit that links the first communication unit and the second communication unit.

A linkage server according to a third aspect of the present invention that establishes a communication with a mobile terminal including an information collection unit that collects information from an outside; a first communication unit that performs a business-operation data communication to perform a business operation using the collected information; and a second communication unit that performs a non-preset communication through voice or text message, whereby the linkage server links the first communication unit and the second communication unit.

A method according to a fourth aspect of the present invention performed by at least one computer and including acquiring business-operation information; determining a destination of a non-preset communication made through voice or text message using at least a part of the acquired business-operation information; and performing the communication using information on the determined destination of the communication.

A computer-readable storage medium according to a fifth aspect of the present invention, which stores a program causing a computer to perform a method including acquiring business-operation information; determining a destination of a non-preset communication made through voice or text message using at least a part of the acquired business-operation information; and performing the non-preset communication using information concerning the determined destination of the non-preset communication. Another aspect of the present invention may include the program stored in the storage medium according to the fifth aspect of the present invention.

According to each of the aspect of the present invention, it is possible to rapidly and effectively establish a communication with a required person while performing business operations.

BRIEF DESCRIPTION OF THE DRAWINGS

FIG. 6 is a diagram illustrating information registered in a user information unit in a linkage server of the information processing system as the second exemplary embodiment according to the present invention.

FIG. 14 is a diagram illustrating a process flow at the time of starting a call in the information processing system as a fourth exemplary embodiment according to the present invention.

DESCRIPTION OF EMBODIMENTS

Hereinbelow, with reference to the drawings, exemplary embodiments of the present invention will be described in detail as typical examples. Constituent elements described in the following exemplary embodiments are merely examples, and it is not intended to limit the technical scope of the present invention to the constituent elements described in the following exemplary embodiments.

First Exemplary Embodiment

Figure 1:
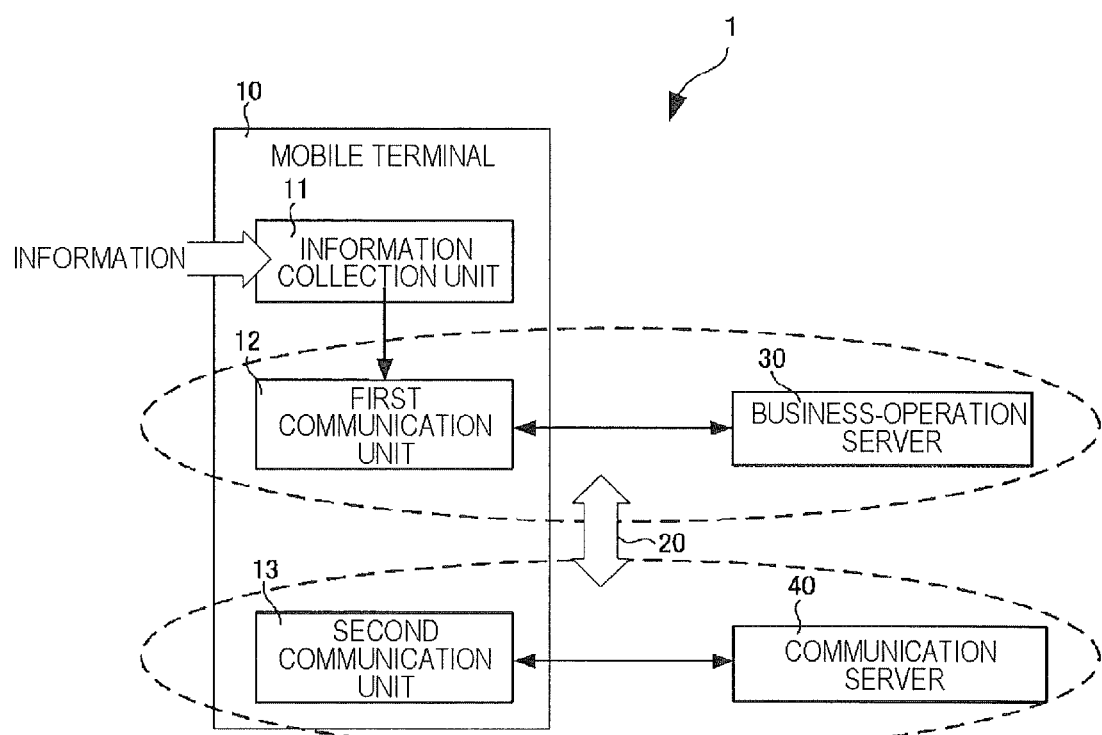
FIG. 1 is a schematic view illustrating an information processing system as a first exemplary embodiment according to the present invention.

FIG. 1 is a schematic view illustrating an information processing system 1 as a first exemplary embodiment according to the present invention. In FIG. 1, the information processing system 1 includes an information collection unit 11, a first communication unit 12, a second communication unit 13, and a linkage unit 20. The information collection unit 11 collects information from the outside. The first communication unit 12 performs business-operation data communications for performing business operations using the collected information. The second communication unit 13 performs non-preset communications through voice or text message. The linkage unit 20 links the first communication unit and the second communication unit.

As illustrated in FIG. 1, it is preferred that the information collection unit 11, the first communication unit 12, and the second communication unit 13 are provided in a mobile terminal 10. The linkage unit 20 may make a linkage between the first communication unit 12 and the second communication unit 13 within the mobile terminal 10. It may be possible to indirectly link the first communication unit 12 and the second communication unit 13, by making a linkage between a business-operation server 30 with which the first communication unit 12 communicates and a communication server 40 with which the second communication unit 13 communicates. Further, it is preferred that the linkage unit 20 serves as a linkage server to make a linkage between the business-operation server and the communication server.

With the configuration described above, it is possible to establish a linkage to have communication through voice or text message while performing data communication for business operations using the information collection unit 11 and the first communication unit 12, thereby obtaining an effect in which a user can significantly effectively and efficiently perform business operations.

Second Exemplary Embodiment

Figure 2:
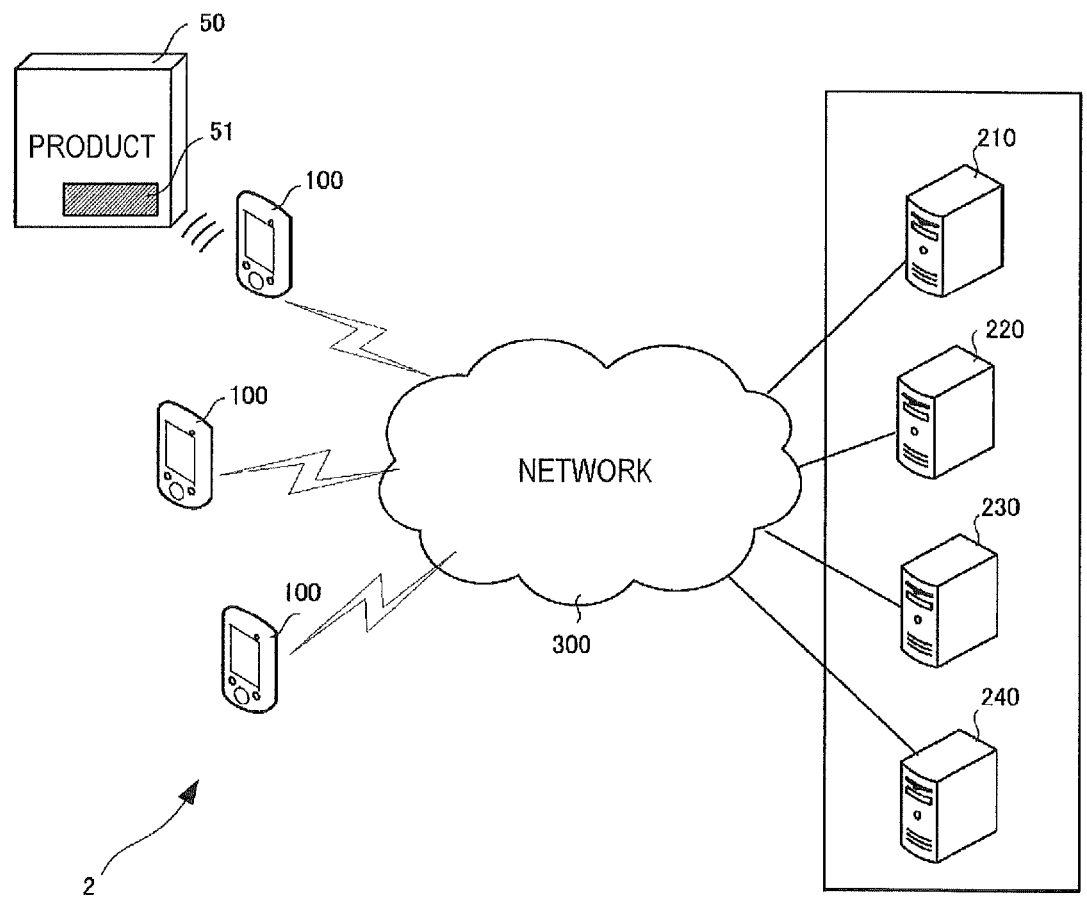
FIG. 2 is a schematic view illustrating an information processing system as a second exemplary embodiment according to the present invention.

FIG. 2 is a schematic view illustrating an information processing system 2 as a second exemplary embodiment according to the present invention. The information processing system 2 illustrated in FIG. 2 has a configuration in which plural mobile terminals 100 are connected through a network 300 to a business-operation server 210, a linkage server 220, a text message server 230, and a voice server 240. Each of the mobile terminals 100 has a function of reading a tag 51 such as a bar code or RFID attached to a product 50, and uses the collected information to access the business-operation server 210 and acquire necessary information.

Figure 3:
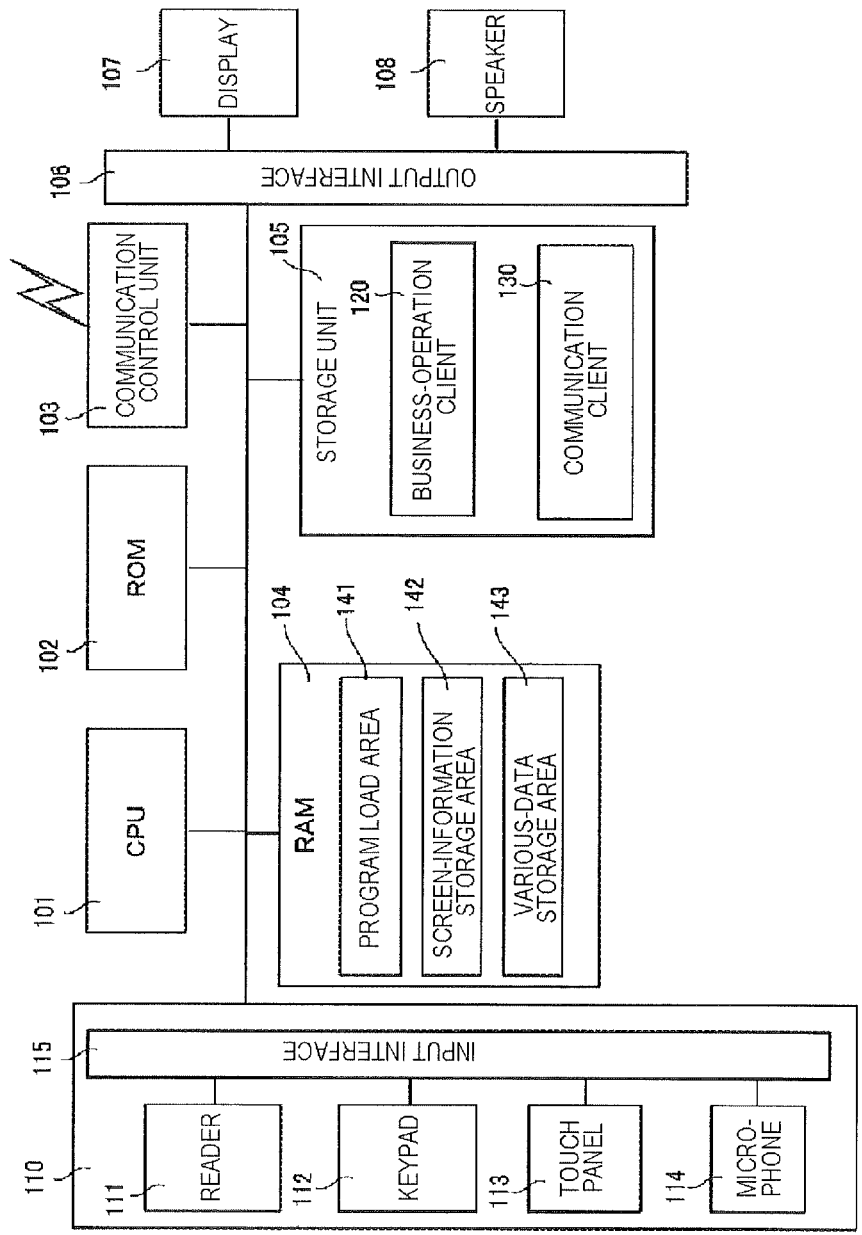
FIG. 3 is a diagram illustrating a hardware configuration of a mobile terminal according to the second exemplary embodiment of the present invention.

FIG. 3 is a diagram illustrating a configuration of the inside of the mobile terminal 100. The mobile terminal 100 includes a CPU 101, a ROM 102, a communication control unit 103, a RAM 104, a storage unit 105, an output interface 106, a display 107, a speaker 108, and an input unit 110. The CPU 101 is a central processing unit, and controls the entire mobile terminal 100 by running various programs.

The ROM 102 is a read-only memory, and stores a boot program that the CPU 101 is required to first run, and various parameters. The communication control unit 103 controls communication through a network with various servers. The RAM 104 is a random access memory, and includes, for example, a program load area 141, a screen-information storage area 142, and a various-data storage area 143. The storage unit 105 stores a business-operation client (application) 120 and a communication client (application) 130.

Images and voices, which the CPU 101 generates through running a program, are outputted through the output interface 106 from, for example, the display 107 or speaker 108.

The input unit 110 includes a reader 111, a keypad 112, a touch panel 113, a microphone 114, and an input interface 115 that transfers input from these units to the CPU 101. In this exemplary embodiment, the reader 111 is a bar code reader as an example. However, the reader 111 may be an RFID tag reader or other reader.

Figure 4:
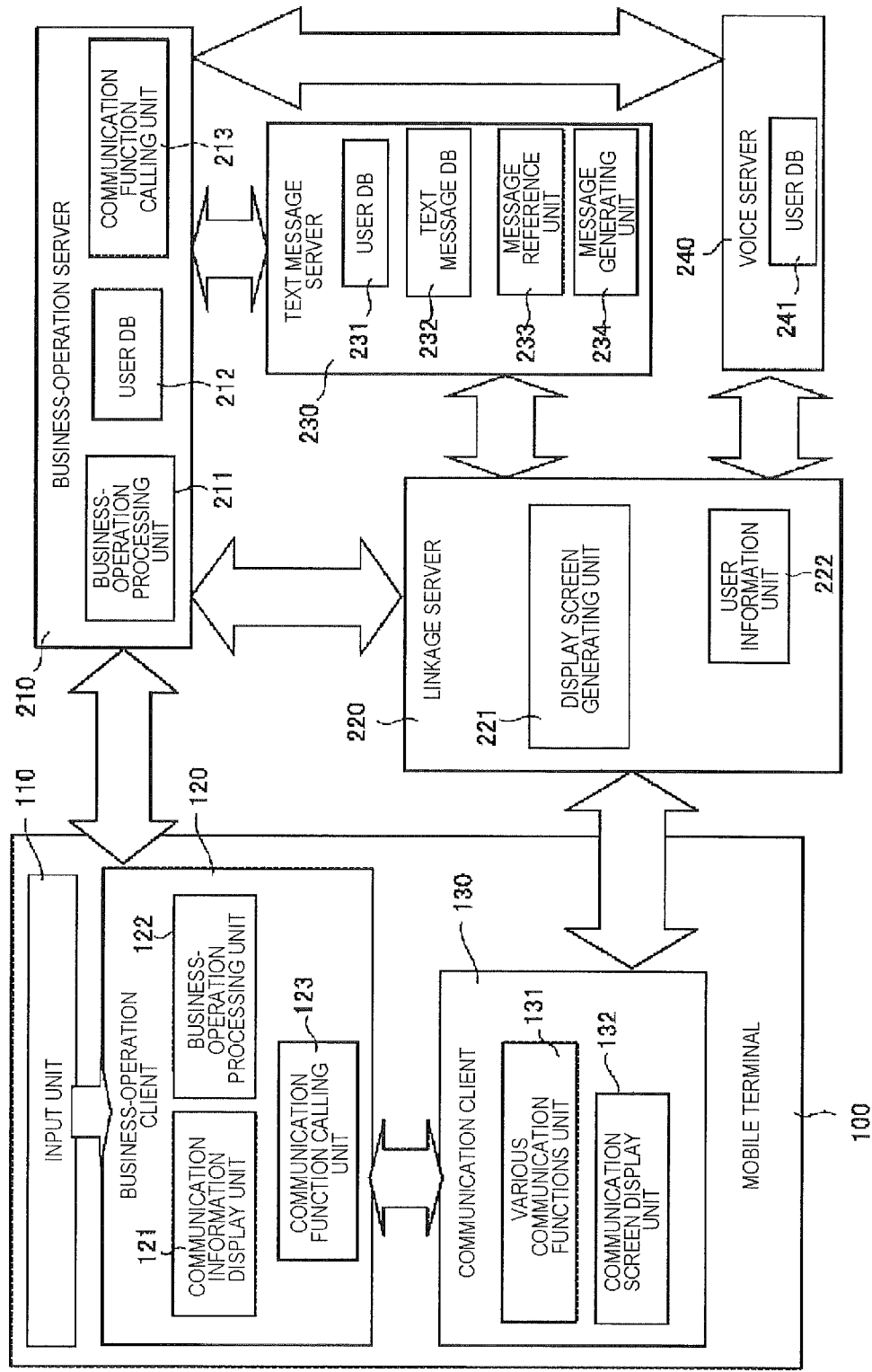
FIG. 4 is a diagram illustrating a process configuration of the information processing system as the second exemplary embodiment according to the present invention.

FIG. 4 is a diagram illustrating a process configuration of the information processing system 2 according to this exemplary embodiment. As illustrated in FIG. 4, the mobile terminal 100 includes the input unit 110, the business-operation client 120, and the communication client 130.

The business-operation client 120 includes a communication information display unit 121 for displaying communication information (for example, information indicating the presence or absence of incoming call history and information concerning reception of a text message) on a business-operation screen. Further, the business-operation client 120 includes a business-operation processing unit 122 that processes business operations with the business-operation server 210, and a communication function calling unit 123 that calls up each function in the communication client 130.

The communication client 130 includes a various communication functions unit 131 and a communication screen display unit 132. The various communication functions unit 131 includes, for example, a phoning control function, a phone function, a new incoming call display control function, an incoming call display control function, a message display control function, and a telephone setting control function.

In association with the mobile terminal 100 having the configuration as described above, the business-operation server 210 includes a business-operation processing unit 211, a user database 212, and a communication function calling unit 213. In this exemplary embodiment, the user database 212 is used for registering users who can log in to the business-operation server 210 to receive services for business operations. More specifically, user IDs and passwords are registered.

The linkage server 220 includes a display screen generating unit 221, and a user information unit 222. The display screen generating unit 221 generates a screen that is to be displayed on the display 107 of the mobile terminal 100, and transfers it to the mobile terminal 100. The generated screen operates in a manner such that a business-operation system (the business-operation client 120 and the business-operation server 210) and a communication system (the communication client 130, the text message server 230, and the voice server 240) are associated with each other.

The text message server 230 includes a user database 231, a text message database 232, a message reference unit 233, and a message generating unit 234. The user database 231 is used for registering users who can log in to the text message server 230 to receive services for business operations. More specifically, user IDs and passwords are registered. The message reference unit 233 stores, for example, preset messages corresponding to business operations.

The display screen generating unit 221 generates a text message generation screen, which is displayed, for example, in an overlapped manner with the screen for business operations on the basis, for example, of user information read out from the user information unit 222 or preset message received from the message reference unit 233.

The voice server 240 is, for example, a SIP server, and includes a user database 241 for registering users who can use a calling function or log in to receive a voice communication service.

Figure 5:
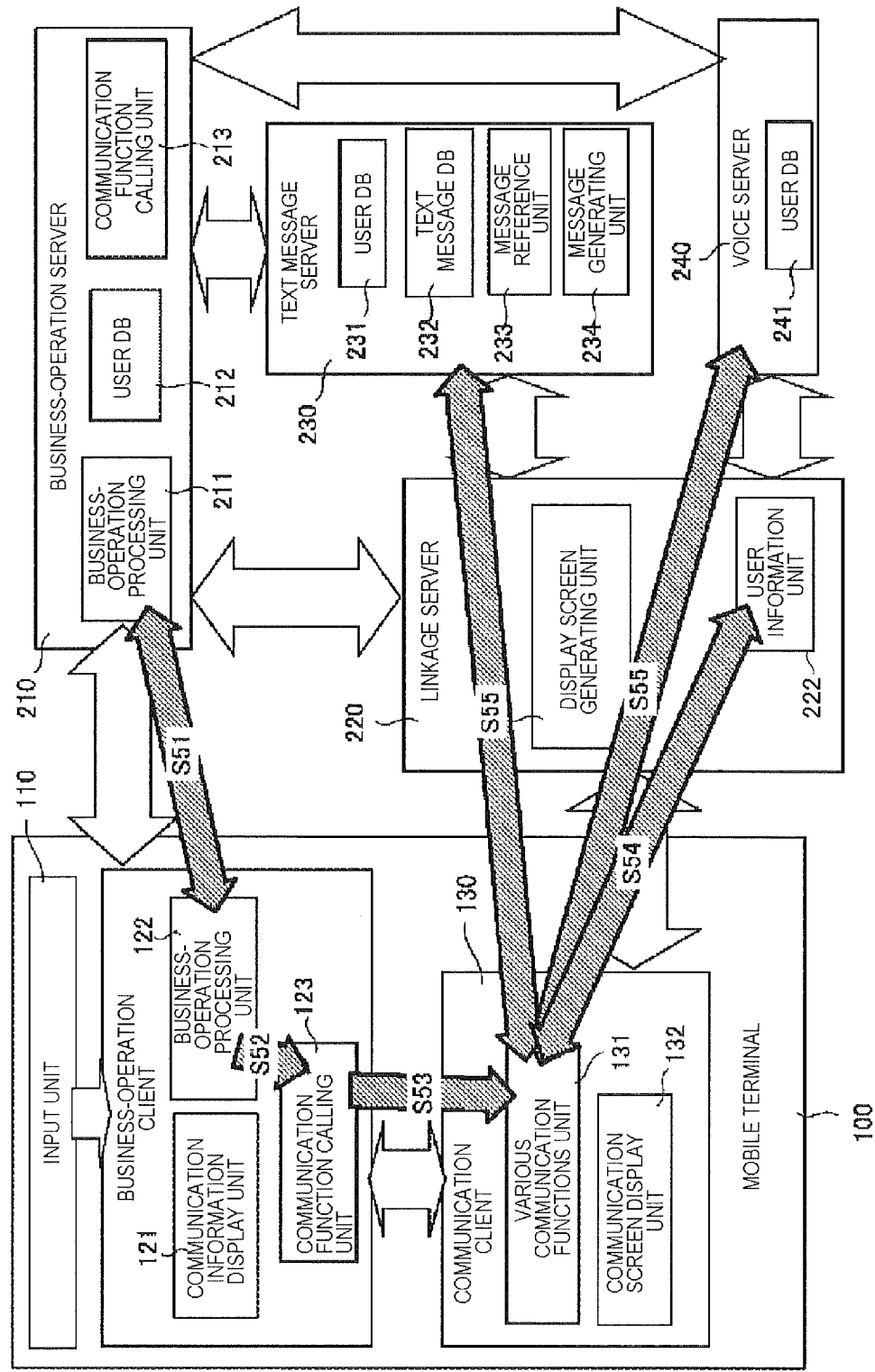
FIG. 5 is a diagram illustrating a flow related to log-in processes in the information processing system as the second exemplary embodiment according to the present invention.

FIG. 5 is a diagram illustrating a process flow at the time of log-in in the information processing system 2 according to this exemplary embodiment. At the time of log-in, a user first activates the business-operation client 120 of the mobile terminal 100, and inputs a user ID and a password. These pieces of information are transferred from the business-operation processing unit 122 to the business-operation processing unit 211 in the business-operation server 210. The business-operation processing unit 211 refers to the user database 212 to perform authentication of the user on the basis of the information received from the mobile terminal 100. If the user is confirmed, as a result of the authentication, to be a user who has been already registered, the business-operation processing unit 211 notifies the business-operation processing unit 122 to that effect (S51).

The business-operation processing unit 122 then requests the communication function calling unit 123 to log in to other server (S52). The communication function calling unit 123 informs the various communication functions unit 131 in the communication client 130 that it should log in to the text message server 230 and the voice server 240. The various communication functions unit 131 has already had addresses of the linkage server 220, the text message server 230, and the voice server 240, and first accesses the linkage server 220 to perform conversion from the user ID for a business-operation server. More specifically, using a table 600 (FIG. 6) stored in the linkage server 220, the user ID for a business-operation server is converted into a user ID for a text message server and a user ID for a voice server (S54). The various communication functions unit 131 uses the thus obtained user IDs to log in to the text message server 230 and the voice server 240 (S55).

The table 600 shown in FIG. 6 is updated when a user who uses the business-operation server 210 is newly registered. In other words, it is desirable that user IDs for the text message server 230 and the voice server 240 are simultaneously registered when the user is newly registered for the business-operation server 210. Further, as shown in the table 600, when the registered user uses the mobile terminal 100, it is desirable to add, to the table 600, information identifying the mobile terminal 100. Although mobile terminal information is indicated as an IP address in FIG. 6, the mobile terminal information is not limited to this in the present invention, and it may be possible that the mobile terminal information is special identification information for identifying a terminal. Further, for a user who has logged in to the business-operation server 210 using a communication terminal different from the mobile terminal 100, identification information of the communication terminal may be registered. It should be noted that, in FIG. 6, a character string formed by numbers and alphabet letters is used for the user ID. However, in the present invention, the user ID is not limited to this, and it may be possible to use a name of the user as the user ID. In particular, SIP-URI is registered as an example of the user ID for the voice server. However, it may be possible to use a character string formed only by numbers such as a telephone number for the user ID for the voice server. Further, personal information of the user such as a name, telephone number, and physical address may be separately registered in association with the user ID.

Process Flow for Starting Call and First Application Example

Figure 7:
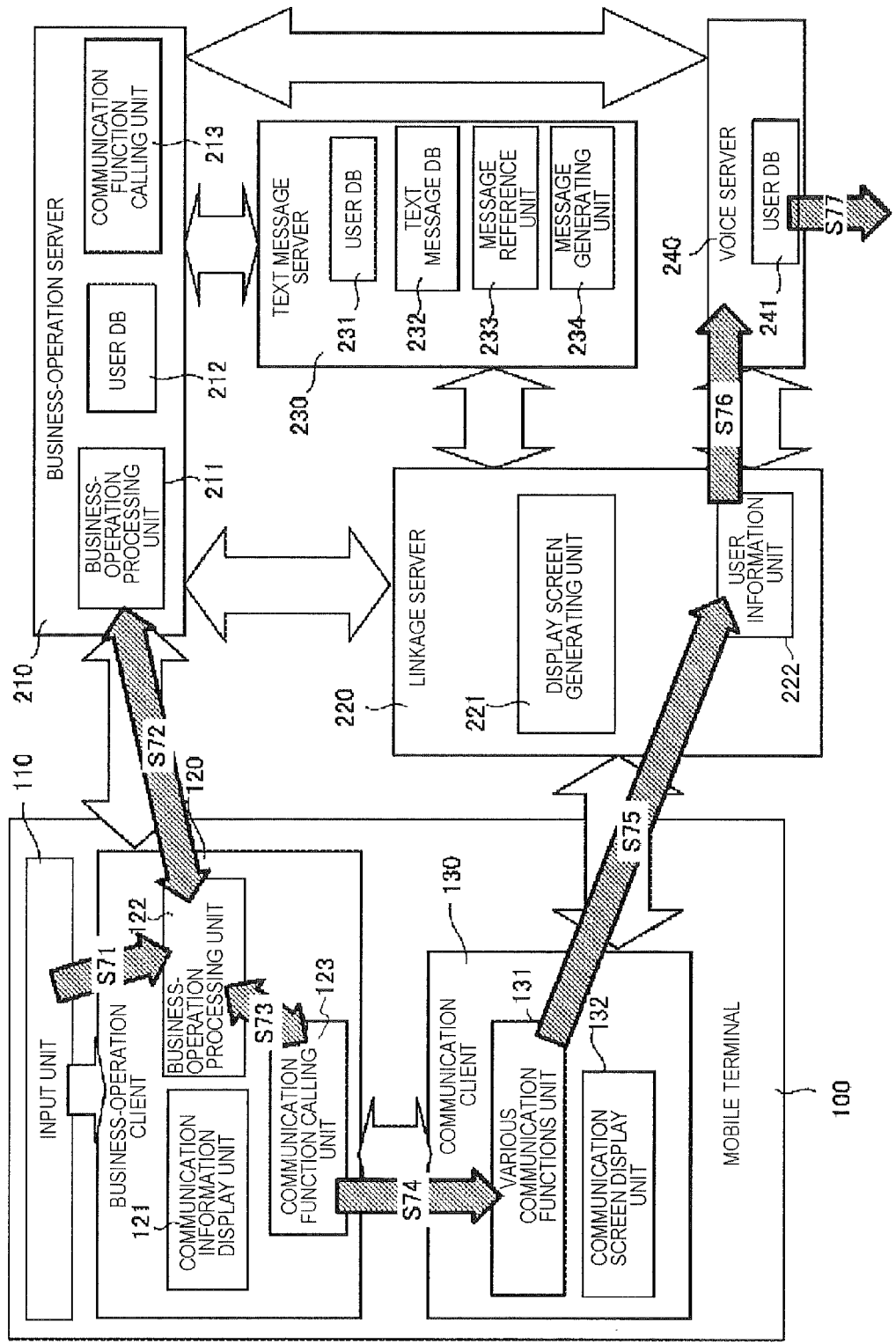
FIG. 7 is a diagram illustrating a process flow for starting a call in the information processing system as the second exemplary embodiment according to the present invention.
Figure 9:
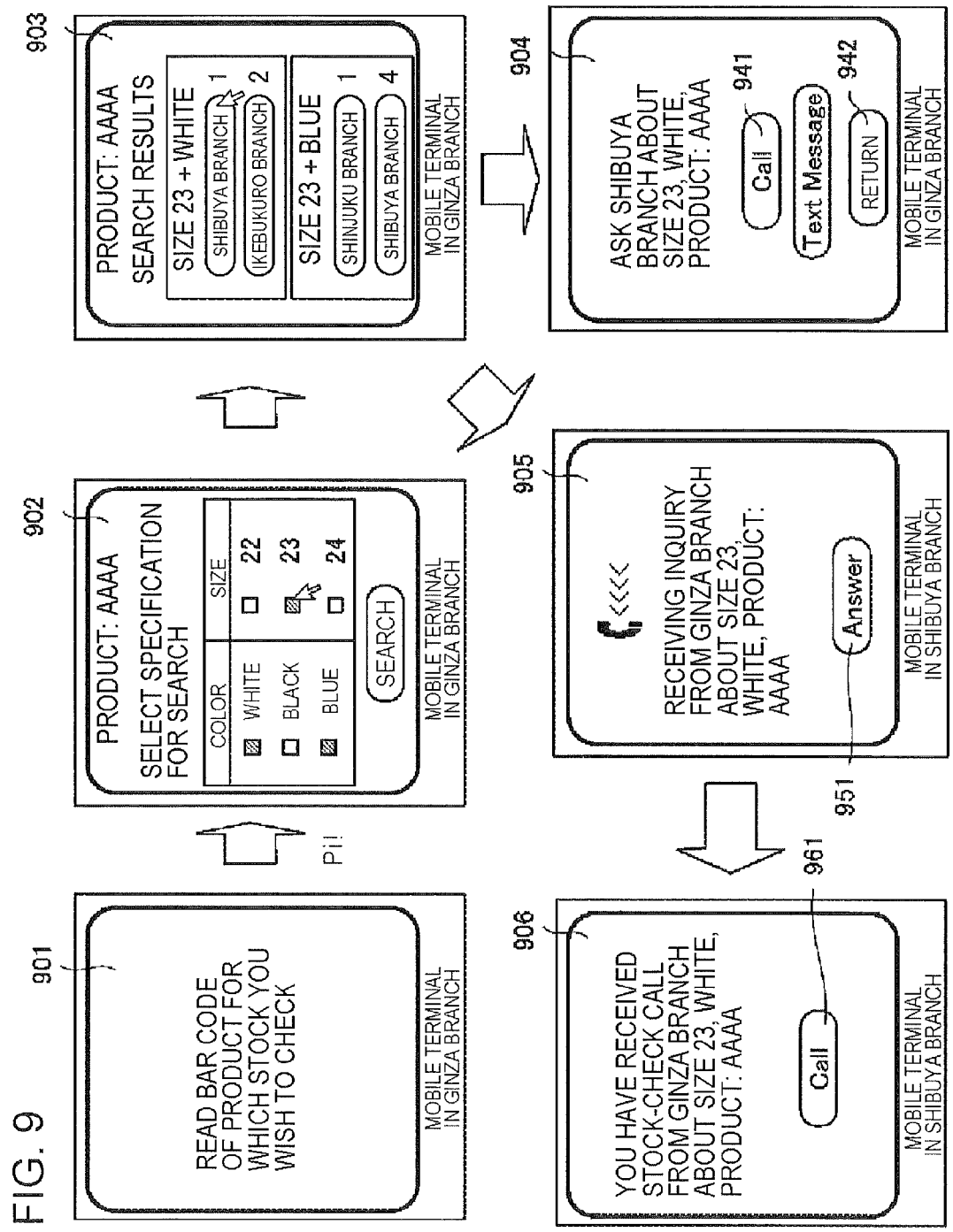
FIG. 9 is a diagram illustrating a screen transition example of a first application example according to the present invention.

FIG. 7 is a diagram illustrating a process flow for starting a call in the information processing system 2 according to this exemplary embodiment. First, the mobile terminal 100 activates the business-operation client 120, performs the log-in process described using FIG. 5, and collects information from the outside using the input unit 110 (S71). For example, a stock searching operation will be described as a first application example. A screen 901 illustrated in FIG. 9 is displayed. Then, a user uses the bar code reader 111 to read a bar code attached to a product for which stock the user wishes to check. The collected information (for example, product number) is transmitted from the business-operation client 120 to the business-operation processing unit 211 of the business-operation server 210 (S72). The business-operation processing unit 211 searches a database, which is not illustrated, on the basis of the received information to obtain business-operation information (for example, specifications of the product), and returns to the business-operation client 120. As a result, the display 107 of the mobile terminal 100 displays, for example, a screen 902 illustrated in FIG. 9. Then, specifications of the product for which the user wishes to search are checked on this screen, and a "Search" button is depressed. The business-operation server 210 receives the information, and refers to a database, which is not illustrated, to perform a specific stock searching operation. In other words, the business-operation server 210 searches the stock database that indicates what kind of products are available in which shop to obtain information on how much stock of product having the desired specifications is available in which shop. The results are transmitted again to the mobile terminal 100, and the display 107 of the mobile terminal 100 displays, for example, a screen 903 illustrated in FIG. 9.

In the case where the business-operation information obtained by the business-operation server 210 is associated with a contact destination through telephone call, the business-operation server 210 transmits characters or images indicating the contact destination together with the business-operation information to the business-operation processing unit 122. In the example illustrated in FIG. 9, the "Shibuya branch," "Ikebukuro branch," "Shinjuku branch," and "Shibuya branch" buttons in the screen 903 represent the contact destinations, and these branch names are transmitted to the mobile terminal 100 as available contact destinations. Contact destination information such as telephone numbers of branches may be transmitted to the mobile terminal 100 in a manner that the information is associated with each of the buttons. However, in this exemplary embodiment, such contact destination information is not transmitted, and only information for identifying the buttons (for example, a button 1 corresponds to a Shibuya branch, and a button 2 corresponds to an Ikebukuro branch) is transmitted. As the specific contact destination information such as a telephone number is not transmitted to the mobile terminal 100 as described above, problems such as leakage of information can be prevented.

In FIG. 7, when an operation serving as a trigger for inquiry through telephone call is received through the display screen concerning the business-operation information such as the screen 903, the business-operation processing unit 122 notifies the communication function calling unit 123 to that effect (S73). Then, the communication function calling unit 123 calls the various communication functions unit 131 of the communication client 130 (S74). With reference to the example illustrated in FIG. 9, if the "Shibuya branch" button is selected, a request to start a telephone call to "Shibuya branch" is transferred to the various communication functions unit 131. At the same time, the business-operation information (product information) such as "size 23, white product AAAA" is transmitted from the business-operation processing unit 122 through the communication function calling unit 123 to the various communication functions unit 131.

The various communication functions unit 131 transmits the request to start the telephone call with a call destination being assigned (and, if necessary, the business-operation information concerning the purpose of the telephone call), and information for identifying the mobile terminal 100 itself (for example, user ID for the business-operation server) to the linkage server 220 (S75).

The linkage server 220 uses the received telephone call destination (for example, Shibuya branch) to refer to the user information unit 222, thereby obtaining the user ID for the voice server associated with the call destination. The linkage server 220 obtains the SIP address as shown, for example, in the table 600 in FIG. 6. Similarly, the linkage server 220 uses information for identifying the mobile terminal 100 itself to obtain the user ID for the voice server (for example, SIP address) of the mobile terminal 100.

The thus obtained two user IDs for the voice server (and, if necessary, the business-operation information) are transferred to the voice server 240 (S76). The voice server 240 confirms, using the user database 241, that these users ID for the voice server correspond to the user IDs of the user who has logged in, and then, makes a call to the destination to start the telephone call conversation.

In the example illustrated in FIG. 9, the mobile terminal 100 on the call originator side displays the screen 904 to ask the user whether to make a call to inquire about the business-operation information, or to generate a text message. If the "Call" button 941 is selected, the telephone call starts. If the "Return" button 942 is selected, the process in the communication client 130 is stopped, and the flow returns to the process made between the business-operation client 120 and the business-operation server 210 (S72).

On the other hand, when receiving an incoming call from the mobile terminal 100 in the Ginza branch, the mobile terminal 100 in the Shibuya branch displays a received message describing inquiry details as illustrated in the screen 905. If the "Answer" button 951 is selected, a response is made to start a voice communication. If the response is not made, details of the incoming call are displayed as illustrated in the screen 906. If the "Call" button 961 is selected, a call to the Ginza branch, which is the call originator, is started to be made.

As described above, the user of the mobile terminal 100 can start to make the call to the inquiry destination for the business operation in an extremely easy manner. At this time, searching for the telephone number is not necessary, and it is only necessary for the user to designate the contact destination displayed as the business-operation information. Further, in this exemplary embodiment, the linkage server 220 manages all the personal information. Thus, the important information such as the telephone number and the SIP address is not transmitted to the mobile terminal 100, so that the risk of leakage of information can be eliminated.

As described above, the business-operation client 120 displays the business-operation information and the information serving as the trigger for starting a telephone call on the display 107 of the mobile terminal 100, so that the mobile terminal can receive operations from the user. With this configuration, the business-operation system and the communication system are linked in an appropriate manner, which makes it possible to significantly reduce the operational burden that the user has to bear.

Process Flow for Transmitting Text Message and First Application Example

Figure 8:
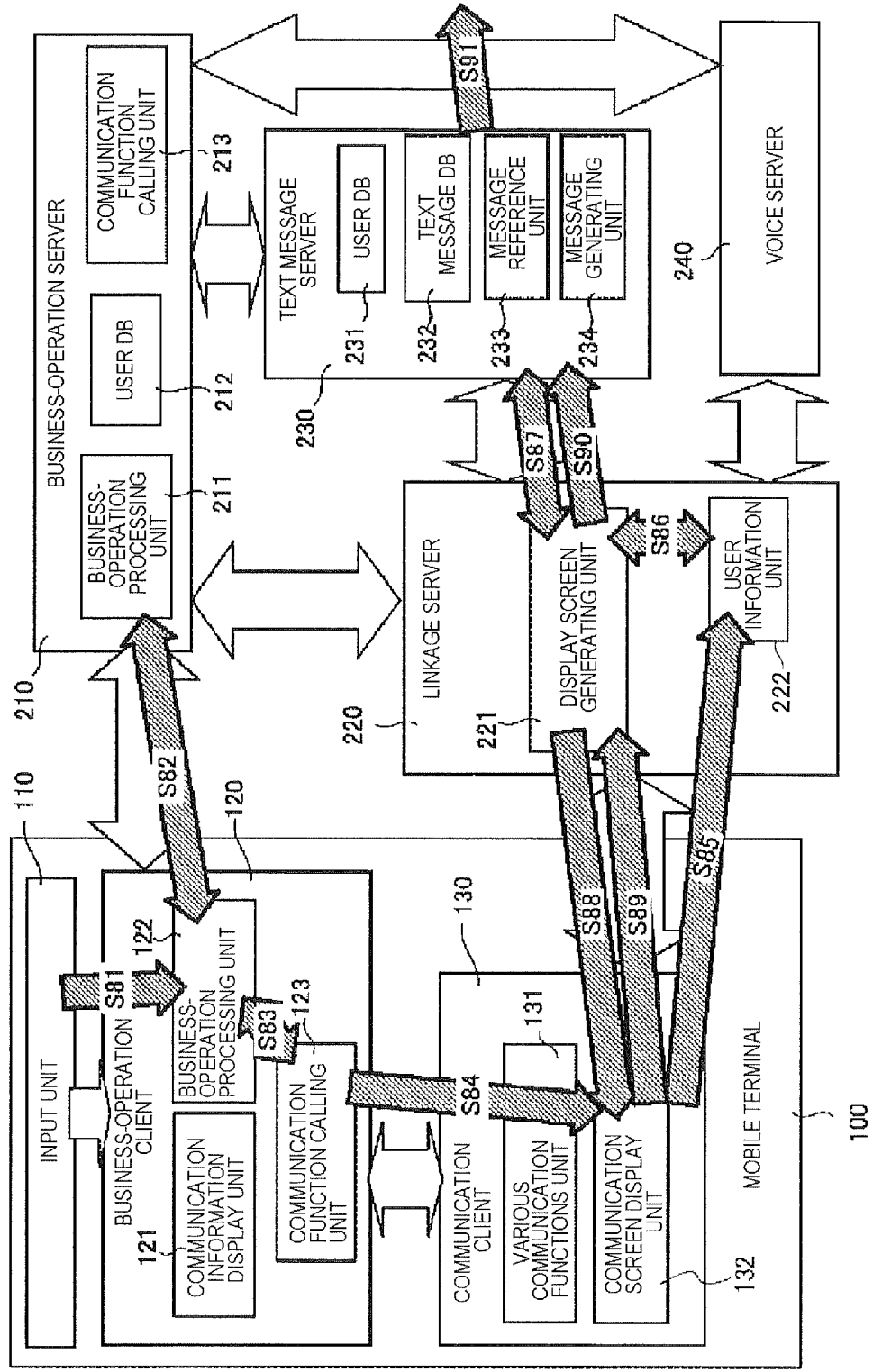
FIG. 8 is a diagram illustrating a process flow at the time of transmitting a message in the information processing system as the second exemplary embodiment according to the present invention.

Next, with reference to FIG. 8, a process flow for transmitting text messages will be described. First, the mobile terminal 100 activates the business-operation client 120, performs the log-in process described using FIG. 5, and collects information from the outside using the input unit 110 (S81). For example, a stock searching will be described. In a similar manner to the case of starting the call, the screen 901 illustrated in FIG. 9 is displayed. Then, the user uses the bar code reader 111 to read the bar code attached to a product for which stock the user wishes to check. The collected information (for example, product number) is transmitted from the business-operation client 120 to the business-operation processing unit 211 of the business-operation server 210 (S82). The business-operation processing unit 211 searches a database, which is not illustrated, on the basis of the received information to obtain business-operation information (for example, specifications of the product), and sends back the obtained business-operation information to the business-operation client 120.

As a result, the display 107 of the mobile terminal 100 displays, for example, the screen 902 illustrated in FIG. 9. Then, specifications of the product for which the user wishes to search are selected on this screen, and a "Search" button is depressed. The business-operation server 210 receives the information, and refers to a database, which is not illustrated, to perform a specific stock searching operation. The results are transmitted again to the mobile terminal 100, and the display 107 of the mobile terminal 100 displays, for example, the screen 903 as illustrated in FIG. 9.

When targets of the inquiry and the inquiry destination are selected, and transmission of a text message is selected, the business-operation processing unit 122 notifies the communication function calling unit 123 to that effect. In response to this notification, the communication function calling unit 123 calls up the various communication functions unit 131 of the communication client 130.

In the example illustrated in FIG. 9, if the "Shibuya branch" button is selected, a request to transmit a text message to the "Shibuya branch" is transferred to the various communication functions unit 131. At the same time, the business-operation information (product information) such as "size 23, white product AAAA" is transmitted from the business-operation processing unit 122 through the communication function calling unit 123 to the various communication functions unit 131.

The various communication functions unit 131 transmits the request to transmit a message whose transmission destination is designated, business-operation information, and information for identifying the mobile terminal 100 itself (for example, the user ID for the business-operation server) to the linkage server 220 (S85).

Figure 11:
FIG. 11 is a diagram illustrating preset message data in a text message server in the information processing system as the second exemplary embodiment according to the present invention.

The linkage server 220 receives the request to transmit the message whose transmission destination (for example, Shibuya branch) is assigned, refers to the user information unit 222, and obtains the user ID for the message server associated with the transmission destination. Similarly, the linkage server 220 uses the information for identifying the mobile terminal 100 itself to obtain the user ID for the message server of the mobile terminal 100. The thus obtained information is transferred to the display screen generating unit 221. The display screen generating unit 221 uses the received information to read a preset text message from the text message server 230 (S87), combines it with the business-operation information, generates a message, and returns the generated message data to the communication screen display unit 132 (S88). The text message server 230 is previously provided with a table 1401 as illustrated in FIG. 11, and determines which preset text message is used, on the basis of the business-operation information, the transmission-source user information, and the location information of the transmission source or transmission destination. A status flag is attached to the preset text message, and message properties such as "urgent", "reply is necessary", and "no reply is necessary" are associated with the preset text message. By transmitting the preset message including these properties to the transmission destination, the transmission destination can easily determine what kind of property this message has.

Next, a detailed description will be made with reference to FIG. 10. Once a transmission destination is designated on a screen such as the screen 903 displaying stock searching results, the mobile terminal 100 displays, for example, a screen 1001, then a text message button 1011 is available to select. Then, when the text message button 1011 is selected, a message sentence as illustrated in a screen 1002 is generated through the linkage server 220 and the text message server 230, and is displayed on the mobile terminal 100. The transmission source and the transmission destination are designated through the mobile terminal 100, and the "Subject, Product name, Specification (size and color in this example)" are obtained from the business-operation information. Further, the expression "Is there any stock? Yes, No. In the case where the stock is little, the number of products available:" in the main body is prepared in advance in the text message server 230. After this, it is possible for the user to transmit the message for checking the stock only by selecting the transmission button 1021 (S89, S90, S91). After the transmission, the display returns to the screen 1003 showing the stock searching results displayed before the generation of the text message. The business-operation server 210 and the text message server 230 cooperate with each other as described above, whereby it is possible to significantly reduce the work load required for transmitting the message.

On the other hand, the terminal on the message receiving side can receive the message while operating the business-operation system. For example, in the example illustrated in FIG. 10, the linkage server 220 and the communication information display unit 121 perform processes in a manner such that a message reception icon 1041 is displayed on a part of the business-operation screen as shown in a screen 1004. The display mode of the message reception icon 1041 can be change according to the properties of the message (whether urgent or not, whether reply is necessary or not). For example, the message reception icon 1041 is normally displayed in black, and when an urgent message is received, the message reception icon 1041 may be displayed in red. When getting the business operation done and checking messages, the user clicks the message reception icon 1041.

When a message-opening operation is performed in the mobile terminal 100, the received message is displayed. In this exemplary embodiment, the received preset message can be used as a message for reply without any modification being applied. Thus, it is possible to significantly reduce the amount of reply operation, by inputting necessary matters such as "YES," "NO" and numeral, and then replying.

Figure 10:
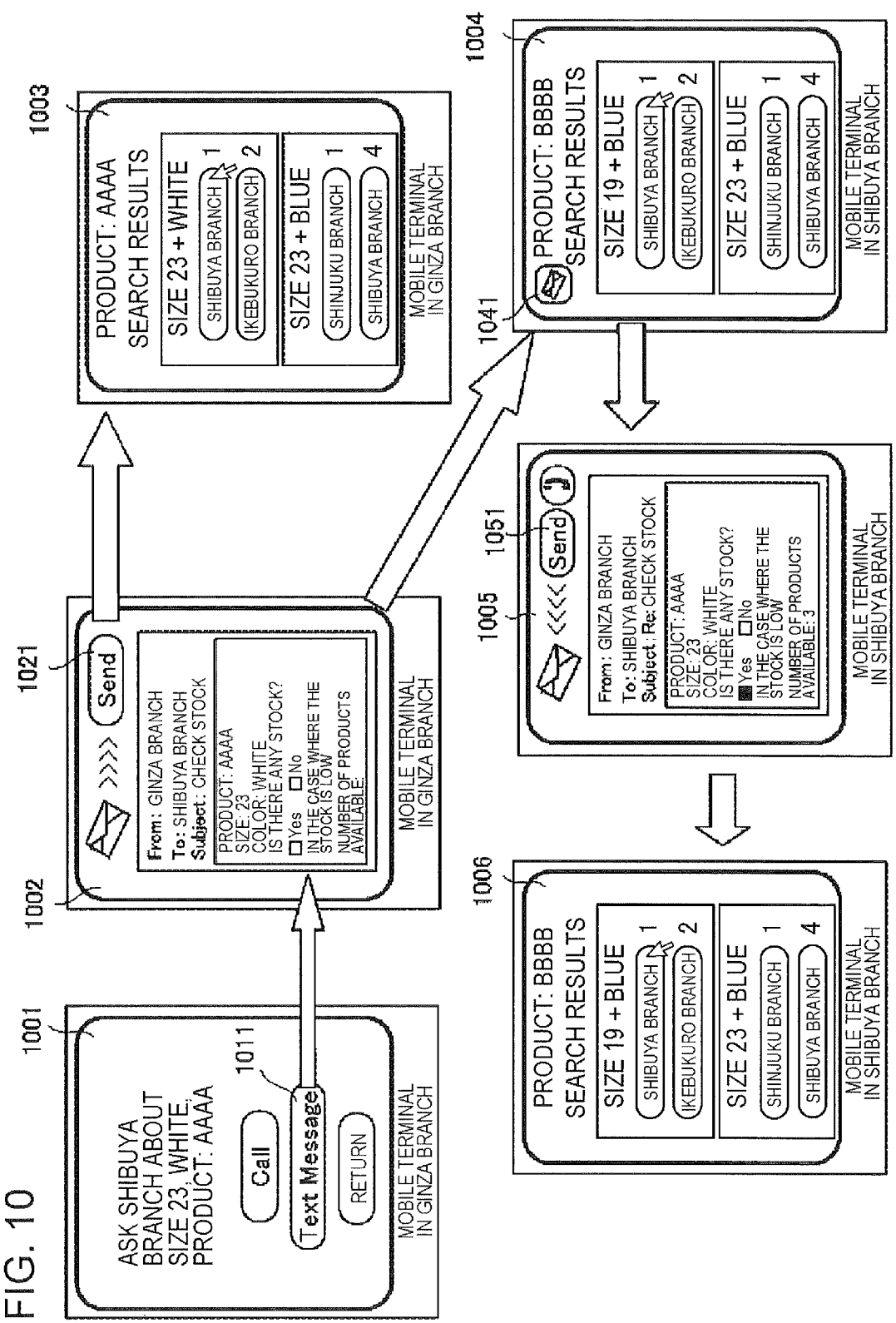
FIG. 10 is a diagram illustrating a screen transition example of the first application example according to the present invention.

For example, in FIG. 10, the screen 1005 is displayed by clicking the message reception icon 1041 on the screen 1004. At this time, a reply message including the stock-confirmation target and the transmission destination, which have been already designated, is displayed. In this example, it is possible to reply only by inputting the availability (Yes, No) of the stock, and if necessary, the number of available products (three in this example). After the reply, the display returns to the original business operation screen 1005 (not having the message reception icon 1041 displayed).

It should be noted that, in this exemplary embodiment, the business-operation information is transmitted through the mobile terminal 100 to the text message server 230. However, the present invention is not limited to this. It may be possible to employ a configuration in which the business-operation server 210 transmits, to the text message server 230, the business-operation information that specifies the mobile terminal 100. In this case, the text message server 230 selects a preset message on the basis of the business-operation information transmitted from the business-operation server 210, and transmits it to the display screen generating unit 221 of the linkage server 220.

As described above, in this exemplary embodiment, the business-operation client has a function serving as a trigger for starting access to the voice server or text message server. More specifically, with a GUI displayed on the mobile terminal by the business-operation client, the user can communicate with a necessary contact without knowing or designating the specific contact during business operations, by displaying a "Call" button or "Create message" button.

Second Application Example

Figure 12:
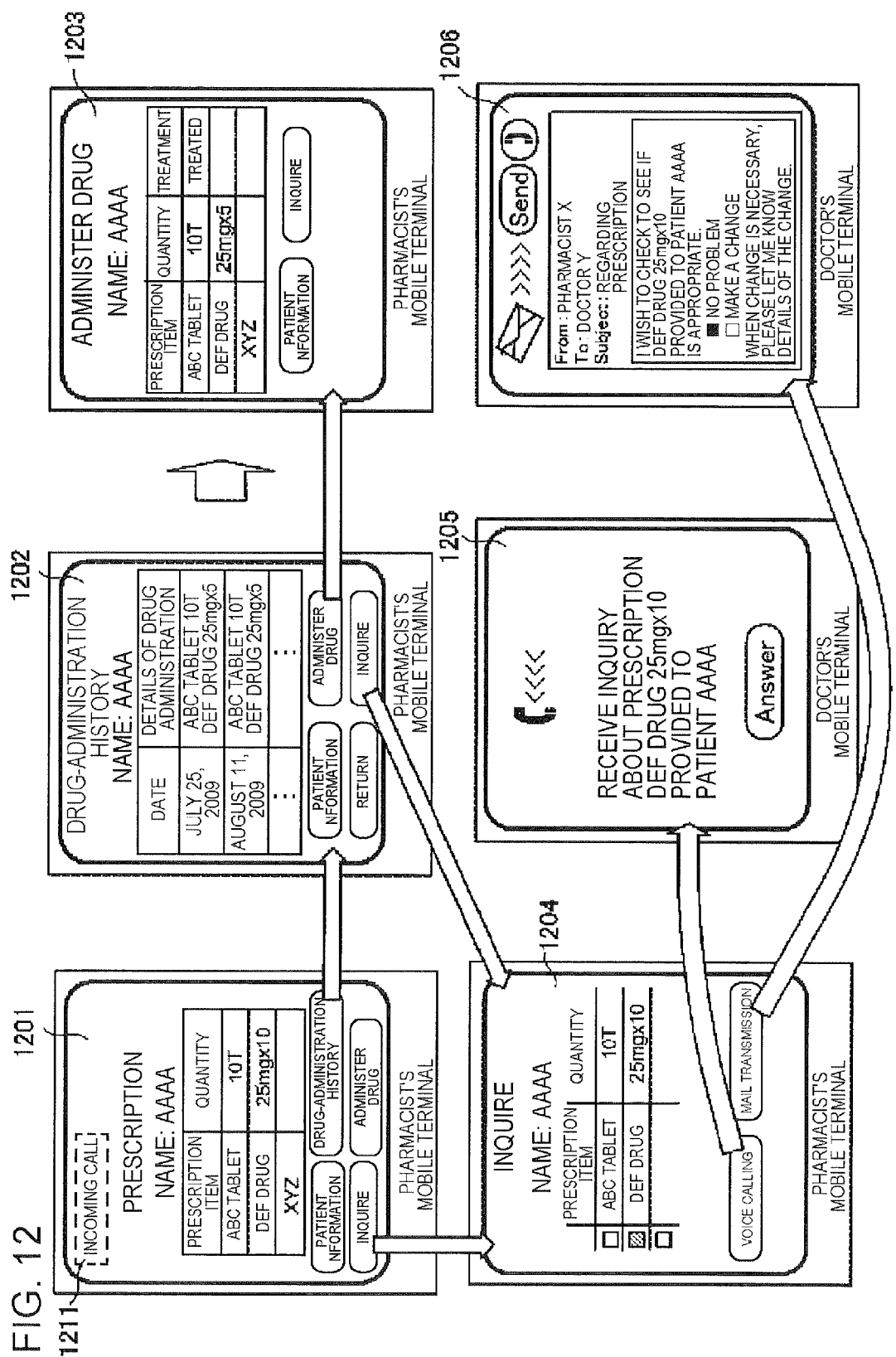
FIG. 12 is a diagram illustrating a screen transition example of a second application example according to the present invention.

With reference to FIG. 12, a description will be made of a specific example in which the information processing system 2 according to this exemplary embodiment is applied to a medical field.

First, when a pharmacist checks prescription through pharmacist's mobile terminal, a screen 1201 is displayed on the pharmacist's mobile terminal. In this example, when a drug-administration history button is selected, the display moves to a screen 1202 to display details of past drug-administration. In the case where an "Administer drug" button is selected on the screen 1201 or screen 1202, a screen 1203 is displayed, and a process moves to drug administration. More specifically, for each drug specified in the prescription, a bar code attached to the drug is read, and then, the information that the drug is provided to a patient (process is completed) is inputted.

If there is any doubt about the prescribed drug at the time of administration of the drug, an "Inquire" button is selected, and the display moves to a screen 1204. By designating the drug that the pharmacist wishes to check and selecting the voice calling, a telephone call is made, and a screen 1205 is displayed on a mobile terminal that a doctor in charge has. At the same time, the business-operation information is also transmitted, which enables the doctor to immediately know what kind of inquiry is coming. When available to respond to the inquiry, the doctor responds to the inquiry to transmit appropriate advice to the pharmacist. In this specific example, the doctor can explain the reason that the number of DEF drug increases from 5 pieces to 10 pieces.

On the other hand, when a mail is transmitted, a screen 1206 is displayed on the mobile terminal of the doctor. At this time, the linkage server 220 reads out the transmission source and the transmission destination on the basis of the business-operation information. Further, on the basis of information obtained from the business-operation client 120 or business-operation server 210, the linkage server 220 modifies a preset message read out from the text message server 230 to generate a main body of the message. The main body of the message has a configuration in which it is possible to reply only by selecting items or inputting numerals. In this application example, by checking that the number of DEF drug increases from 5 pieces to 10 pieces, it is possible to reply with "No problem." Then, by receiving the reply from the doctor, the pharmacist can confidently administers the drug.

As described above, by applying this exemplary embodiment to the medical field, and checking the administration of drug or examination results, it is possible to prevent medical malpractices and accelerate treatments. For example, by scanning both the patient and drug to be administered, it is possible to prevent careless medical mistakes. By inputting the examination results and drug administration record of the patient through a mobile terminal, and uploading them to a server, it is possible to transmit information and share the information in the medical field in real time. Further, by adding a location-specifying function to the mobile terminal, it is possible to check the location of medical staff while staying at a nurses station, thereby efficiently arranging and calling the staff. Yet further, it is possible to make the most of data to improve communication between medical staff. As described above, by holding a discussion among the medical staff on the basis of the data (examination results and drug administration results) scanned with the mobile terminal, it is possible to reduce the time required for dealing with and reduce the number of medical mistakes. Further, it is possible to simultaneously broadcast, to all the medical staff, matters that all the medical staff has to know.

Other Specific Application Examples

Store Operation

By applying the information processing system 2 according to this exemplary embodiment to a business-operation system for store operations, and further modifying it, this business-operation system can be used for the following applications.
(1) Acquire the number of available products, location of the available stock or other information through a mobile terminal from a server.
(2) Acquire operational instruction information or other information from a server.
(3) Transmit order-processing information to a server.
(4) Acquire order status information from a server.
(5) Always notify a server of current location of the mobile terminal (employee).

Further, a communication system having an association with the business-operation system can be used for the following applications.
(1) Simultaneously broadcast today's reminder or other message through text message.
(2) Read merchandise information serving as a target of merchandise searching from a bar code, and transmit the merchandise information through text message.
(3) Check available merchandise with a person in charge in other shop using a telephone in the case where the stock is available in this shop. At this time, a product number is acquired from a bar code to let the person in charge know the merchandise information, and is transmitted through text message. Reserve the merchandise in stock and check delivery time using a telephone or through access to a system using a mobile terminal.
(4) Get in contact through voice to ask an unclear matter that cannot be understood only through the system or to notify occurrence of accident at a shop.
(5) A temporary worker having less knowledge about merchandise checks with a skilled person in an office through telephone to make certain of display arrangement or availability of merchandise. Transmit information on the merchandise or related URL through text to the mobile terminal that the temporary worker has.
(6) Simultaneously broadcast information on lost child or related URL information through text message.
(7) Notify a manager through telephone or text when finding a child who looks like the lost child. At the same time, notify the manager of the current location. Check using telephone or camera that the child is the target child.
(8) Ask for help from staff working at a currently non-crowded section through telephone or text message to operate at a section where a large crowd is expected to show up because of a bargain sale. Reply with OK/NO through telephone or text message.

In the above-described situations, it is possible to provide customers with appropriate and quick services in a shop, thereby improving the customer satisfaction, and to achieve cooperation in business operations such as stock checking and ordering, thereby improving operational efficiency. Further, by supporting employees having less ability, it is possible to equivalently improve the quality of all the employees, thereby improving the customer satisfaction.

[Warehouse Operation]

By applying the information processing system 2 according to this exemplary embodiment to a business-operation system for warehouse operations, and further modifying it, this business-operation system can be used for the following applications.
(1) Check incoming products and invoice using a scanner function to perform an inspection operation.
(2) Check stock of other warehouse on site in real time.
(3) Read bar codes of outgoing products, and acquire information on the outgoing products, thereby managing shipping of products.
(4) Attach bar codes to each storage section in the warehouse, and read the bar code, thereby managing incoming products and storage sections so as to be associated with each other.

Further, a communication system having an association with the business-operation system can be used for the following applications.
(1) Immediately get in contact with the manager through voice if the number of incoming products is found to be insufficient or damage in the incoming products during an incoming operation or inspection. Add product information read through the scanner to text message.
(2) Give field staff voice-instructions.
(3) Order the insufficient stock through voice, and transmit product information in an electronic data form.

In the above-described situations, it is possible to make storage management, inventory management and product collection much easier, and reduce the ordering error.

[Fitness Center]

By applying the information processing system 2 according to this exemplary embodiment to a business-operation system for fitness centers, and further modifying it, this business-operation system can be used for the following applications.

(1) Instructors carry a mobile terminal, and users wear a wristband having a bar code attached thereto. The mobile terminal reads the bar code, and acquires the degree of skill or health conditions from a server. Give appropriate advice on how to use equipment or the degree of load.

(2) Consult the server about a facility reservation or confirmation of reservation, and provide a user with usage information.

Further, a communication system having an association with the business-operation system can be used for the following application.

(1) An unskilled instructor makes a call to a skilled instructor to seek appropriate advice.

Further, it may be possible to employ a configuration in which a mobile terminal is connected to equipment to enable a user to use the mobile terminal. In the above-described situation, fitness centers can provide their users with detailed services.

Third Exemplary Embodiment

Figure 13:
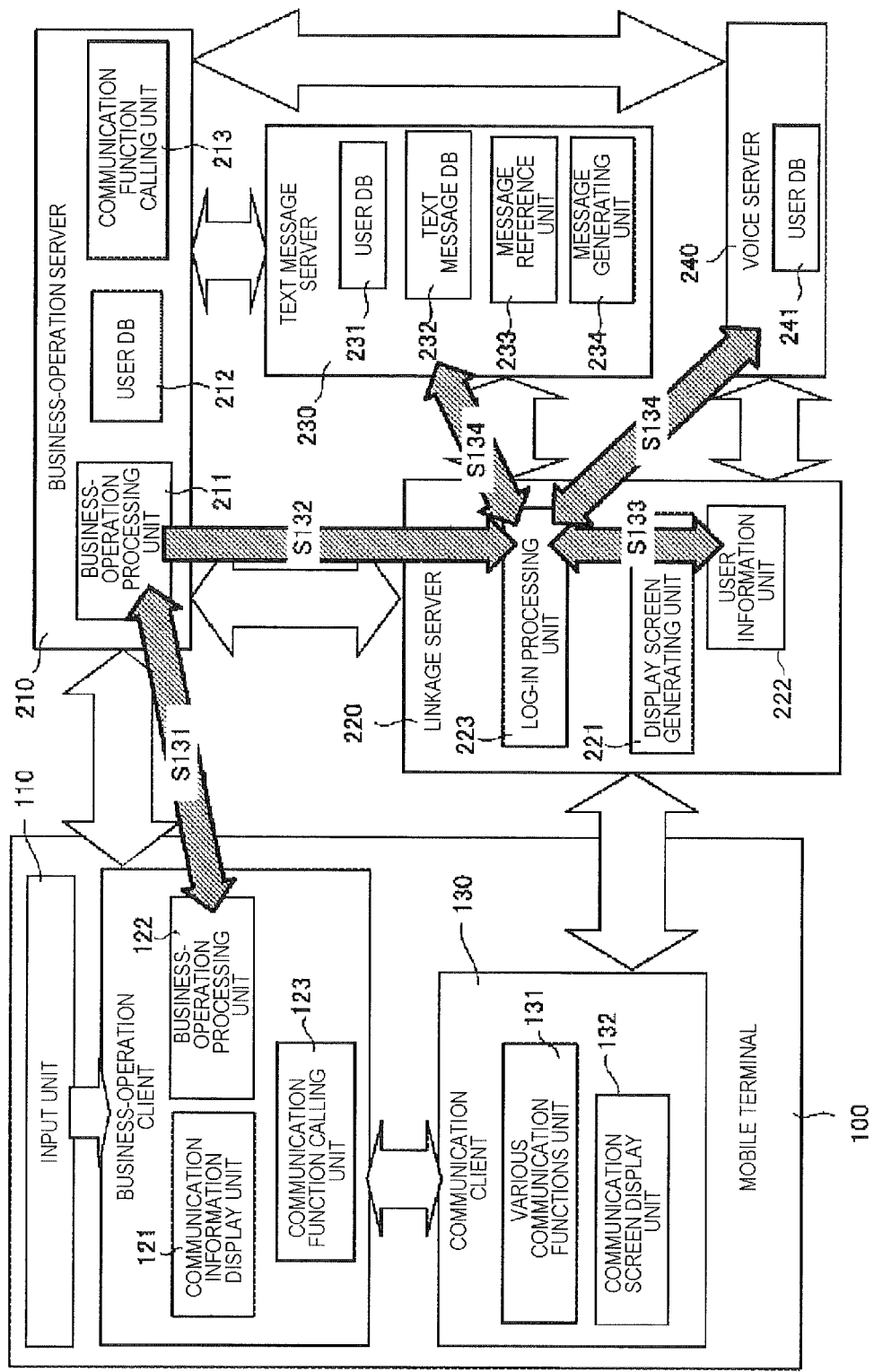
FIG. 13 is a diagram illustrating a flow related to log-in processes in the information processing system as a third exemplary embodiment according to the present invention.

An information processing system as a third exemplary embodiment of the present invention will be described with reference to FIG. 13. Since the configuration of the information processing system itself is almost the same as that of the second exemplary embodiment, the same constitutional elements are denoted by the same reference characters, and detailed description thereof will not be repeated.

Unlike the second exemplary embodiment, in this exemplary embodiment, the linkage server 220 includes a log-in processing unit 223. When the mobile terminal 100 performs a log-in process, the log-in processing unit 223 performs the log-in process for the text message server 230 and the voice server 240 by proxy.

At the time of log-in, the user first activates the business-operation client 120 of the mobile terminal 100, and inputs a user ID and a password. These pieces of information are transferred from the business-operation processing unit 122 to the business-operation processing unit 211 of the business-operation server 210. The business-operation processing unit 211 refers to the user database 212 to perform authentication of the user on the basis of the information received from the mobile terminal 100. If it is confirmed, as a result of the authentication, that the user is a user who has been already registered, the business-operation processing unit 211 notifies the business-operation processing unit 122 to that effect (S131).

Then, the business-operation processing unit 211 notifies the log-in processing unit 223 of the user ID for the business-operation server of the user who uses the mobile terminal 100, and that the user has completed logging in the business-operation server 210 (S132). The log-in processing unit 223 uses the received log-in information (user ID for the business-operation server) to refer to the user information unit 222 and convert into various user IDs. More specifically, the log-in processing unit 223 uses the table 600 (FIG. 6) stored in the linkage server 220 to convert the user ID for the business-operation server into the user ID for the text message server and the user ID for the voice server (S133). The log-in processing unit 223 uses the user IDs obtained through the conversion to log in to the text message server 230 and the voice server 240 (S134).

By performing the log-in process as described above, it is possible to eliminate the need for storing the personal information in the mobile terminal 100, which makes it possible to strengthen the security. Further, it is possible to reduce the frequency of communication between the mobile terminal 100 and various servers, whereby it is possible to effectively use the communication resources.

Fourth Exemplary Embodiment

An information processing system as a fourth exemplary embodiment of the present invention will be described with reference to FIG. 14. Since the configuration of the information processing system itself is almost the same as that of the second exemplary embodiment, the same constitutional elements are denoted by the same reference characters, and detailed description thereof will not be repeated.

Unlike the second exemplary embodiment, in this exemplary embodiment, the communication function calling unit 123 transmits a request to start a communication to the communication function calling unit 213 in the business-operation server 210. Specific process flows will be described below.

When an operation serving as a trigger for inquiry through telephone call is received through the display screen concerning the business-operation information such as the screen 903 in FIG. 9, the business-operation processing unit 122 notifies the communication function calling unit 123 to that effect (S73). Then, the communication function calling unit 123 transmits the request to start the communication to the communication function calling unit 213 of the business-operation server 210, rather than the communication client 130 (S144).

In response to the request, the communication function calling unit 213 transmits the transmission source information and the transmission destination information (for example, information such as the Ginza branch and the Shibuya branch) to the voice server 240. The voice server 240 transmits these pieces of information to the linkage server 220, and refers to the table 600 in the user information unit 222 illustrated in FIG. 6, thereby obtaining the user ID for the voice server. The user IDs for the voice server on the call originator side and the call receiving side are transferred to the voice server 240. The voice server 240 makes a call to each of the sides to connect them, enabling the communication between them (S147).

As described above, according to this exemplary embodiment, only by making a request of "wish to have communication concerning this business operation" using the mobile terminal, "designating the contact destination" and "telephone calling process" are performed on the servers side. With this configuration, the mobile terminal never holds personal information, not even temporarily. Thus, even if the mobile terminal is lost, there is nothing to worry about information leakage from the mobile terminal. Further, the volume of memory unit necessary for the mobile terminal can be reduced.

Unlike general mobile phones or smartphones, in the business-operation system, one mobile terminal is shared with a large number of unspecified workers such as temporary workers. In other words, the user of the mobile terminal is not fixed, and it is expected that users frequently take turns using the mobile terminal. Thus, it is important that the mobile terminal does not hold information on the destinations of the communication, not even temporarily. In such an application, this exemplary embodiment is significantly effective.

Other Exemplary Embodiments

These are detailed descriptions of the exemplary embodiments according to the present invention. However, the present invention includes systems and devices obtained by variously combining the features contained in each of the exemplary embodiments.

Further, the present invention may be applied to a system formed by plural devices or units, or may be applied to a single device. Yet further, the present invention may be used in an application in which an information processing program that carries out each of the functions of the exemplary embodiments described above is provided directly or remotely to a system or device. Thus, the present invention includes a program to be installed in a computer to enable the computer to carry out the functions of the present invention, a computer-readable storage medium (including a sustainable storage medium) that stores the program, and a WWW server that allows the program to be downloaded.

Other Expressions of the Exemplary Embodiments

All or part of the exemplary embodiments may be described as the following supplementary notes but is not limited to the following supplementary notes.

[Supplementary Note 1]

An information processing system including:

an information collection unit that collects information from an outside;

a first communication unit that performs a business-operation data communication to perform a business operation using the collected information;

a second communication unit that performs a non-preset communication through voice or text message; and a linkage unit that links the first communication unit and the second communication unit.

[Supplementary Note 2]

The information processing system according to Supplementary Note 1, in which the linkage unit is provided in a mobile terminal, and serves as a communication function calling unit that starts the non-preset communication performed by the second communication unit during the business-operation data communication performed by the first communication unit.

[Supplementary Note 3]

The information processing system according to Supplementary Note 1 or 2, further including:

a mobile terminal having the information collection unit, the first communication unit, and the second communication unit;

a business-operation server that provides the first communication unit with business-operation information; and a communication server that performs the non-preset communication with the second communication unit.

[Supplementary Note 4]

The information processing system according to Supplementary Note 3, in which the linkage unit is a linkage server that links the business-operation server and the communication server.

[Supplementary Note 5]

The information processing system according to Supplementary Note 4, in which the linkage server associates a user ID managed by the business-operation server with a user ID managed by the communication server.

[Supplementary Note 6]

The information processing system according to Supplementary Note 4 or 5, including a voice server and a text message server serving as the communication server.

[Supplementary Note 7]

The information processing system according to any one of Supplementary Notes 3 to 6, in which when a user who uses the mobile terminal logs in to the business-operation server, the linkage server logs in to the communication server by proxy on the basis of information concerning log-in to the business-operation server.

[Supplementary Note 8]

The information processing system according to any one of Supplementary Notes 3 to 7, in which when the business-operation server provides the business-operation information, a destination of the non-preset communication is determined.

[Supplementary Note 9]

The information processing system according to any one of Supplementary Notes 3 to 7, in which the communication server determines a destination of the non-preset communication using the business-operation information provided by business-operation server.

[Supplementary Note 10]

The information processing system according to any one of Supplementary Notes 3 to 7, in which the linkage unit determines a destination of the non-preset communication using the business-operation information provided by the business-operation server.

[Supplementary Note 11]

The information processing system according to any one of Supplementary Notes 1 to 10, in which the first communication unit displays a screen for performing the business-operation data communication and a screen for performing the non-preset communication, and receives an instruction to start the non-preset communication performed by the second communication unit during the business-operation data communication.

[Supplementary Note 12]

A mobile terminal including:

an information collection unit that collects information from an outside;

a first communication unit that performs a business-operation data communication to perform a business operation using the collected information;

a second communication unit that performs a non-preset communication through voice or text message; and a linkage unit that links the first communication unit and the second communication unit.

[Supplementary Note 13]

A linkage server that establishes a communication with a mobile terminal including:

an information collection unit that collects information from an outside;

a first communication unit that performs a business-operation data communication to perform a business operation using the collected information; and a second communication unit that performs a non-preset communication through voice or text message, thereby linking the first communication unit and the second communication unit.

[Supplementary Note 14]

The linkage server according to Supplementary Note 13, in which the first communication unit determines a destination of the non-preset communication using business-operation information acquired through the business-operation data communication.

[Supplementary Note 15]

An information processing method performed by at least one computer and including:

acquiring business-operation information;

determining a destination of a non-preset communication through voice or text message using at least a part of the acquired business-operation information; and performing the communication using information on the determined destination of the communication.

[Supplementary Note 16]

The information processing method according to Supplementary Note 15, in which the acquisition of the business-operation information includes collecting information from an outside, and acquires the business-operation information using the collected information.

[Supplementary Note 17]

The information processing method according to Supplementary Note 15 or 16, further including:

transmitting a destination of the non-preset communication using an identifier for identifying the destination of the non-preset communication, said identifier being included in at least a part of the acquired business-operation information.

[Supplementary Note 18]

A computer-readable storage medium that stores a program causing a computer to perform a method including:

acquiring business-operation information;

determining a destination of a non-preset communication through voice or text message using at least a part of the acquired business-operation information; and performing the non-preset communication using information concerning the determined destination of the non-preset communication.

[Supplementary Note 19]

A program that causes a computer to perform a method including:

acquiring business-operation information;

determining a destination of a non-preset communication through voice or text message using at least a part of the acquired business-operation information; and performing the non-preset communication using information concerning the determined destination of the non-preset communication.

The present application claims priority based on Japanese Patent Application No. 2010-135517 filed in Japan on Jun. 14, 2010, the disclosures of which are incorporated herein by reference in their entirety.

The invention claimed is:

1. An information processing system comprising:
   an information collection unit that collects information from an outside;
   a first communication unit that performs a business-operation data communication to perform a business operation using the collected information;
   a second communication unit that performs a non-preset communication through voice or text message; and
   a linkage unit that links the first communication unit and the second communication unit,
   wherein the linkage unit causes the second communication unit to start the non-preset communication during the business-operation data communication being performed by the first communication unit.

2. The information processing system according to claim 1, wherein the linkage unit is provided in a mobile terminal.

3. The information processing system according to claim 2, further comprising:
   a mobile terminal having the information collection unit, the first communication unit, and the second communication unit;
   a business-operation server that provides the first communication unit with business-operation information; and
   a communication server that performs the non-preset communication with the second communication unit.

4. The information processing system according to claim 1, further comprising:
   a mobile terminal having the information collection unit, the first communication unit, and the second communication unit;
   a business-operation server that provides the first communication unit with business-operation information; and
   a communication server that performs the non-preset communication with the second communication unit.

5. The information processing system according to claim 4, wherein
   the linkage unit comprises a linkage server that links the business-operation server and the communication server.

6. The information processing system according to claim 5, wherein
   the linkage server associates a user ID managed by the business-operation server with a user ID managed by the communication server.

7. The information processing system according to claim 6, further comprising a voice server and a text message server serving as the communication server.

8. The information processing system according to claim 5, further comprising a voice server and a text message server serving as the communication server.

9. The information processing system according to claim 4, wherein
   when a user who uses the mobile terminal logs in to the business-operation server, the linkage server logs in to the communication server by proxy on the basis of information concerning log-in to the business-operation server.

10. The information processing system according to claim 4, wherein
    when the business-operation server provides the business-operation information, a destination of the non-preset communication is determined.

11. The information processing system according to claim 4, wherein
    the communication server determines a destination of the non-preset communication using the business-operation information provided by business-operation server.

12. The information processing system according to claim 4, wherein
    the linkage unit determines a destination of the non-preset communication using the business-operation information provided by the business-operation server.

13. The information processing system according to claim 1, wherein
    the first communication unit displays a screen for performing the business-operation data communication and a screen for performing the non-preset communication, and receives an instruction to start the non-preset communication performed by the second communication unit during the business-operation data communication.

14. A mobile terminal comprising:
an information collection unit that collects information from an outside;
a first communication unit that performs a business-operation data communication to perform a business operation using the collected information;
a second communication unit that performs a non-preset communication through voice or text message; and
a linkage unit that links the first communication unit and the second communication unit,
wherein the linkage unit causes the second communication unit to start the non-preset communication during the business-operation data communication being performed by the first communication unit.

15. A linkage server that establishes a communication with a mobile terminal comprising:
an information collection unit that collects information from an outside;
a first communication unit that performs a business-operation data communication to perform a business operation using the collected information; and
a second communication unit that performs a non-preset communication through voice or text message,
whereby the linkage server links the first communication unit and the second communication unit,
wherein the linkage server causes the second communication unit to start the non-preset communication during the business operation data communication being performed by the first communication unit.

16. The linkage server according to claim 15, wherein
the first communication unit determines a destination of the non-preset communication using business-operation information acquired through the business-operation data communication.

\* \* \* \* \*